United States Patent [19]
Maki

[11] Patent Number: 5,308,253
[45] Date of Patent: May 3, 1994

[54] PLUG HOLDER

[76] Inventor: Philip J. Maki, 4860 Morris Thomas Rd., Duluth, Minn. 55811

[21] Appl. No.: 967,230

[22] Filed: Oct. 27, 1992

[51] Int. Cl.⁵ ............................................. H01R 13/44
[52] U.S. Cl. ................................... 439/148; 439/528; 248/205.3
[58] Field of Search ............... 248/205.3, 206.2, 222.4, 248/231.8; 174/135; 439/40, 41, 148, 527, 528, 571, 574, 575

[56] References Cited

U.S. PATENT DOCUMENTS

| | | | |
|---|---|---|---|
| 2,138,735 | 11/1938 | Ellis | 173/361 |
| 2,721,717 | 10/1955 | Wales | 248/206 |
| 3,019,357 | 1/1962 | Zaffina | 439/575 X |
| 3,049,688 | 8/1962 | Sinopoli . | |
| 3,325,639 | 6/1967 | King | 240/52.15 |
| 3,520,988 | 7/1970 | Ballock, Sr. | 174/135 |
| 3,553,627 | 1/1971 | Gerber . | |
| 4,467,263 | 8/1984 | Conforti et al. | 439/929 X |
| 4,690,476 | 9/1987 | Morgenrath | 439/502 |
| 4,752,054 | 6/1988 | Jönsson | 248/51 |
| 4,772,220 | 9/1988 | Hallier, Jr. | 439/528 |
| 5,056,677 | 10/1991 | Toyosawa | 248/205.3 X |
| 5,141,192 | 8/1992 | Adams | 248/231.8 |
| 5,178,555 | 1/1993 | Kilpatrick et al. | 248/222.4 X |

FOREIGN PATENT DOCUMENTS 0669872  4/1989  Switzerland .......................... 439/40

Primary Examiner—Neil Abrams
Assistant Examiner—Khiem Nguyen
Attorney, Agent, or Firm—Kinney & Lange

[57] ABSTRACT

A holder for securing receptacle plugs of electrical extension cords at selected positions. The holder has a base having an engagement portion extending therefrom to engage the receptacle plug to hold it, and a support engagement portion extending therefrom to engage a selected support structure to become affixed to that structure, or at least temporarily affixed thereto subject to removal.

18 Claims, 5 Drawing Sheets

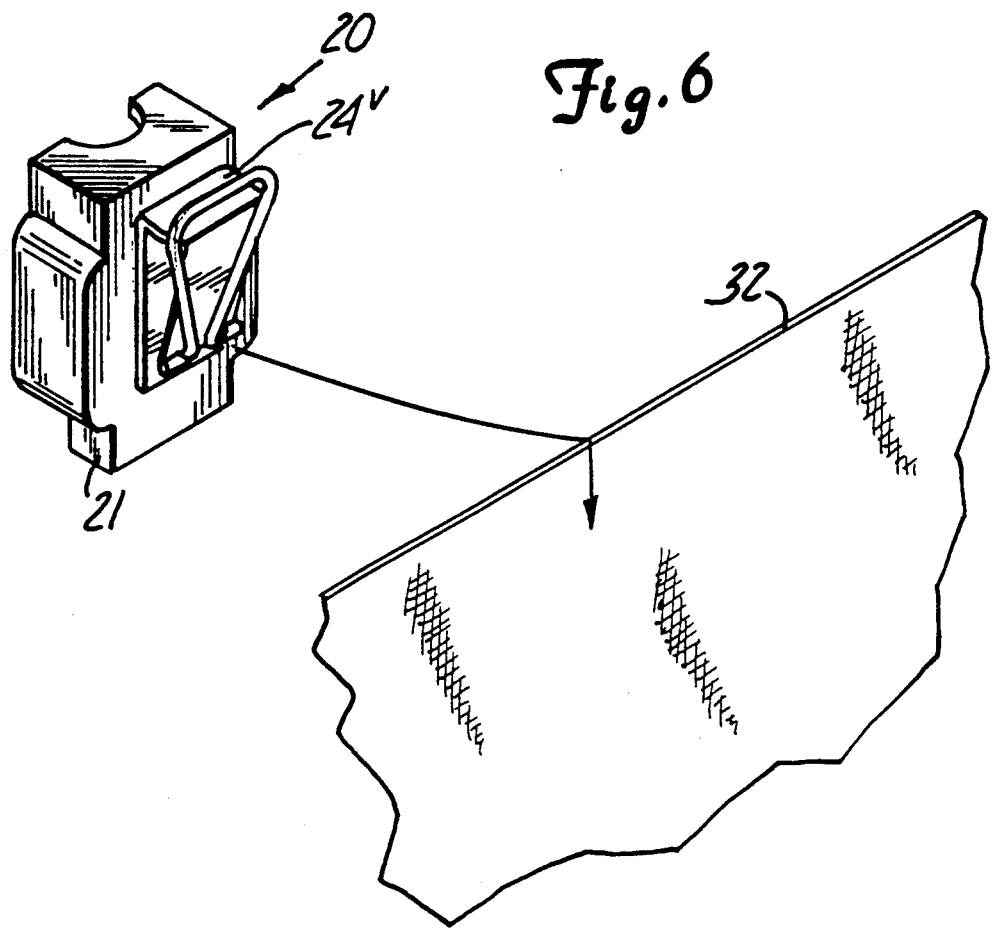
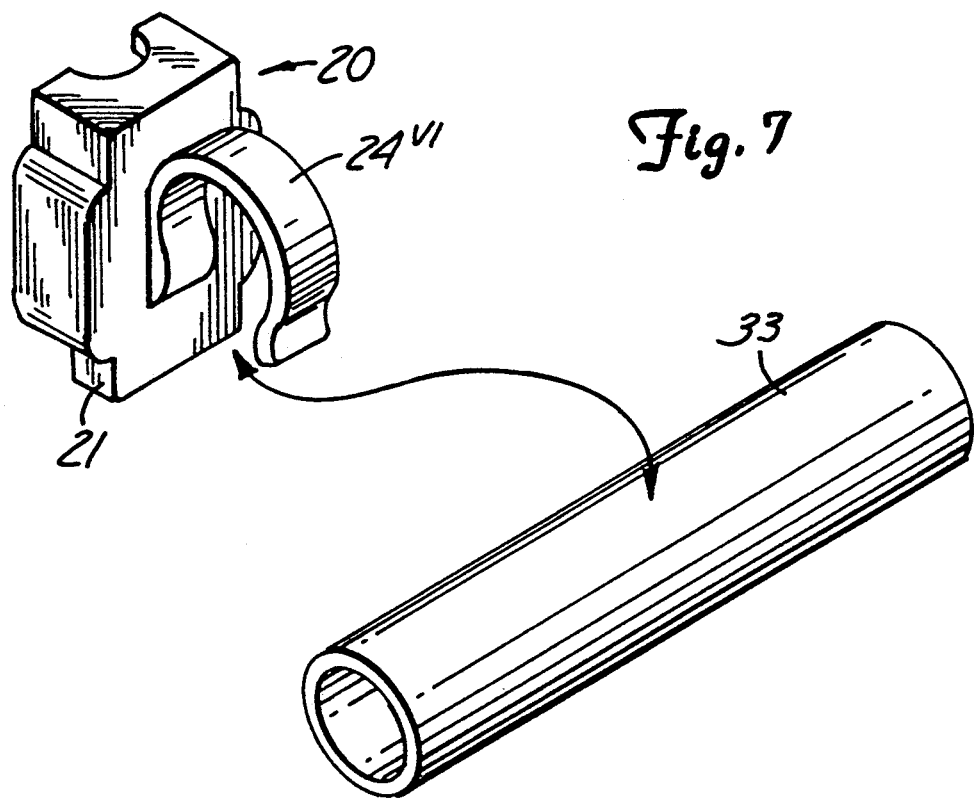

PLUG HOLDER

BACKGROUND OF THE INVENTION

The present invention relates to holders for plugs which can be conveniently attached to a nearby support and, more particularly, to holders for electrical extension cord plugs.

Electronically controlled machines and electrical appliances have become ubiquitous in both the home and the office. Similarly, many toys are available which are often provided with substantial electronic control and display arrangements for use in various electrical operation therewith. Special electrical lighting and various communication devices are also often found at these locations.

This proliferation of electrical and electronic devices has become so great as to often result in insufficient numbers of electrical wall receptacles being provided to supply the necessary electrical power, or such receptacles have been positioned in such a manner as to not take sufficiently into account the need for electrical power in locations other than where provided. As a result, there has been and remains a substantial need for electrical extension cords to make available electrical power to these various devices as needed.

Often, even with the use of an extension cord, use of the electrical appliance or special lighting or the like will remain inconvenient or difficult. If the appliance is being moved by the user, such as with an electrically powered iron during the ironing of clothes, the appliance cord and extension cord at least in part hang below the ironing board and so are dragged across it during movement of the iron. This adds to the effort required to complete the ironing, and at times leads to entanglements with the clothes being ironed draped over the ironing board. Similarly, use of an electric carving knife is often complicated by the risk of the power cord being dragged during use on the serving dishes, plates, etc.

In other situations, the appliance or machine is provided with a very short power cord and is used a relatively long way off the floor. In those circumstances, a substantial fraction of an extension cord used therewith must be more or less vertical to reach the power cord, and so much of the extension cord weight hangs on the power cord, sometimes leading to disconnection of the power cord plug from the extension cord receptacle plug. A typical situation in which this difficulty arises is in the electrical lighting of Christmas trees where the light string often has a short power cord which ends well up in the Christmas tree a significant distance from the floor.

In these, and in other circumstances, the inconvenience or the difficulty encountered could be substantially alleviated if an electrical receptacle for supplying electrical power was at a different location than they usually are. That is, most electrical receptacles are installed about 12 inches above the floor in most residences and offices, but many of these appliances or much special lighting or the like are used several feet above the floor. Thus, there is a substantial need for a means to effectively position a source of electrical power which is at a significant distance from the wall receptacle where such power is available.

SUMMARY OF THE INVENTION

The present invention provides a receptacle plug holder for supporting at selected locations electrical receptacle plugs on ends of electrical extension cords, the receptacle plug holder having an electrically insulated base portion, an electrical receptacle engagement portion extending from the base portion to hold such a receptacle plug, and a support engagement portion extending from the base portion for being substantially affixed to a selected support structure. The support engagement portion may be just temporarily affixed to such a support structure. The electrical receptacle engagement portion may be based on having a pair of blades which can be extended into the receptacle slots of receptacle plugs on extension cords.

BRIEF DESCRIPTION OF THE DRAWINGS

FIG. 6 shows an alternative embodiment and a corresponding use situation in part in a pictorial view, FIG. 7 shows an alternative embodiment and a corresponding use situation in part in a pictorial view.

DETAILED DESCRIPTION OF THE PREFERRED EMBODIMENTS

Figure 1:
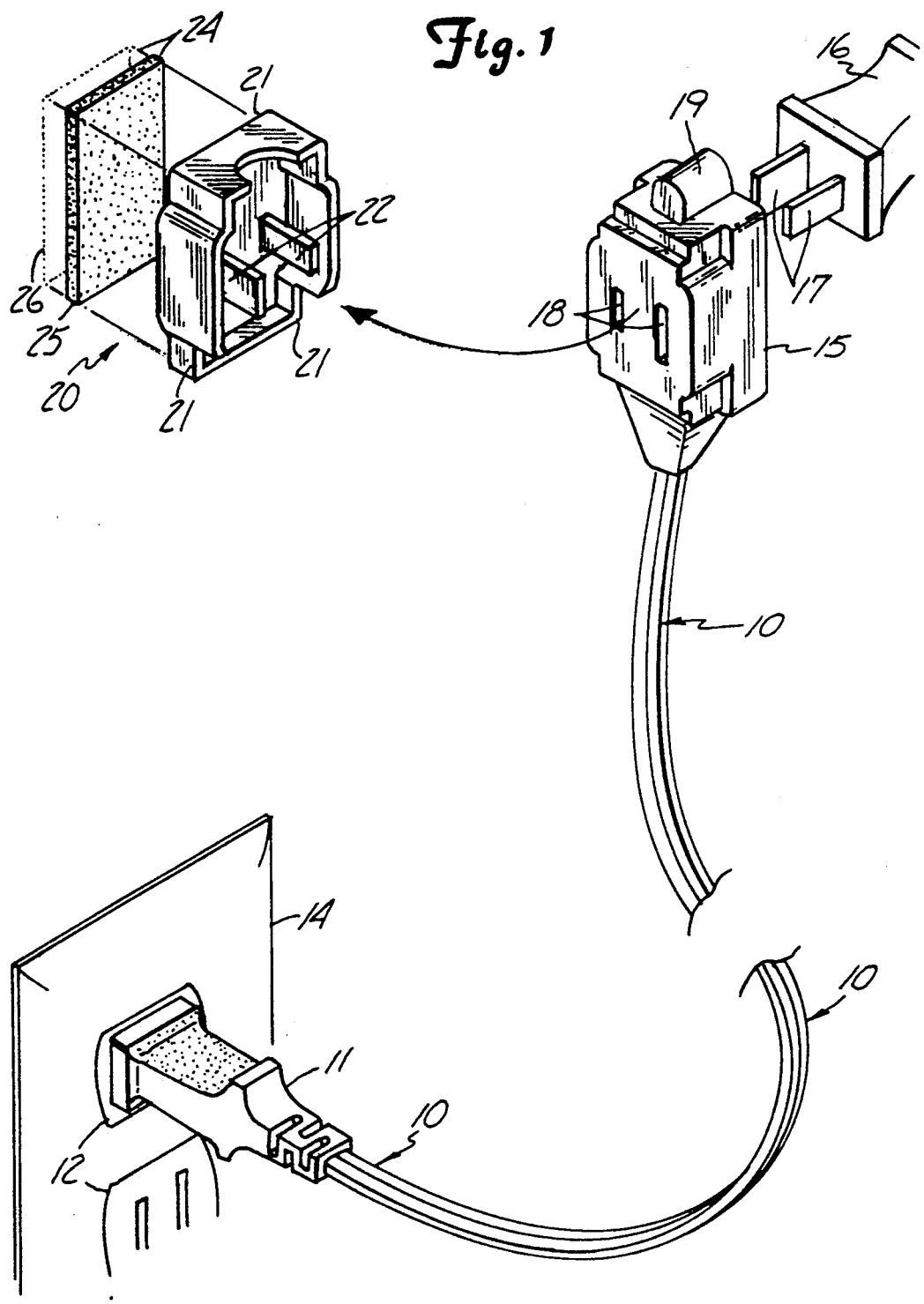
FIG. 1 shows a partly exploded pictorial view of an arrangement in which the present invention is used including an embodiment thereof.

FIG. 1 shows in a partly exploded pictorial view a typical representative, 10, of commonly used electrical extension cords having a male plug, 11, on one end thereof, i.e. an insertion plug. Plug 11 is shown inserted in a common double plug wall receptacle, 12, typically used to provide access to a source of electrical power. The lower receptacle of double plug wall receptacle 12 which is not shown having an insertion plug therein is shown with receptacle slots, 13, for receiving the blades of some other insertion plug (not shown). The upper receptacle in double plug wall receptacle 12 is shown with insertion plug 11 inserted in the receptacle slots also provided therein. Portions of double plug wall receptacle 12 are covered by a wall plate, 14.

Extension cord 10 is shown in FIG. 1 with a break in the middle indicating that not all of the cord is shown. At the opposite end of extension cord 10 from insertion plug 11 there is provided a female plug, 15, or a receptacle plug, which is shown extended to reach a power cord, 16, (shown only in part to the extent of its insertion plug) of an appliance or machine or other electrical arrangement (not shown) which is intended to receive electrical power as provided at double plug wall receptacle 12 through cord 10. The insertion plug of power cord 16 is shown poised to have its pair of blades, 17, inserted in a corresponding pair of blade slots in one of the receptacles facing the plug of cord 16 provided in receptacle plug 15 (not seen in the view of FIG. 1 because of plug 15 being turned away from the viewer).

Receptacle plug 15 is a typical plug for the receptacle end of an extension cord, and has one or more pairs of blade slots or receptacles on the side thereof facing power cord 16, and a further pair of blade receptacles, 18, on the opposite side facing the viewer. A blocking protrusion, 19, is shown present to prevent the insertion therein of insertion plugs on cords having a third, grounding blade provided therewith.

Shown poised for insertion into pair of blade slots 18 in the receptacle on the facing side of receptacle plug 15 is a holder, 20, for engaging receptacle plug 15 to secure it to a selected position on some selected structure which can be located some distance above or laterally away from, or both, double plug wall receptacle 12. Holder 20 has a base portion, 21, of typically an electrical insulating material. A pair of blades, 22, typically of the same material as used in forming base 21, extend from base 21 for insertion into receptacle blade slots such as slots 18 in receptacle plug 15. Thus, holder 20 can engage and hold receptacle plugs at the ends of extension cords by insertion of blades 22 into the blade slots of such plugs.

On the opposite side of base 21 of holder 20 is a support engaging arrangement, 24, for engaging a selected support and substantially affixing holder 20 thereto. The engaging arrangement shown in FIG. 1 is formed from double-backed adhesive tape, 25, having an adhesive surface on both major sides thereof. The adhesive on one side thereof facing holder 20 is used to adhere tape portion 25 to holder 20. The other side of tape 25 has a protective layer, 26, provided thereon preventing the adhesive on that side of tape 25 from sticking to anything else until a user is ready to cause holder 20 to be adhered to a selected support. At that time, cover 26 is peeled away and holder 20 with tape 25 adhered thereto is placed against the support so that the adhesive on the side of tape 25 opposite base 21 engages that selected support.

As a result, with holder 20 engaging the selected support at a desired position thereon and also engaging blade slots 18 of a receptacle of receptacle plug 15, that plug with at least one other of its receptacles faces power cord 16 from its selected position from which power cord 16 will then extend after insertion into a plug 15 receptacle. Proper selection of the position at which receptacle plug 15 is secured by holder 20 can thus provide an electrical power connection for extension cord 16 at a location resulting in a substantial convenience for a user.

Figure 2:
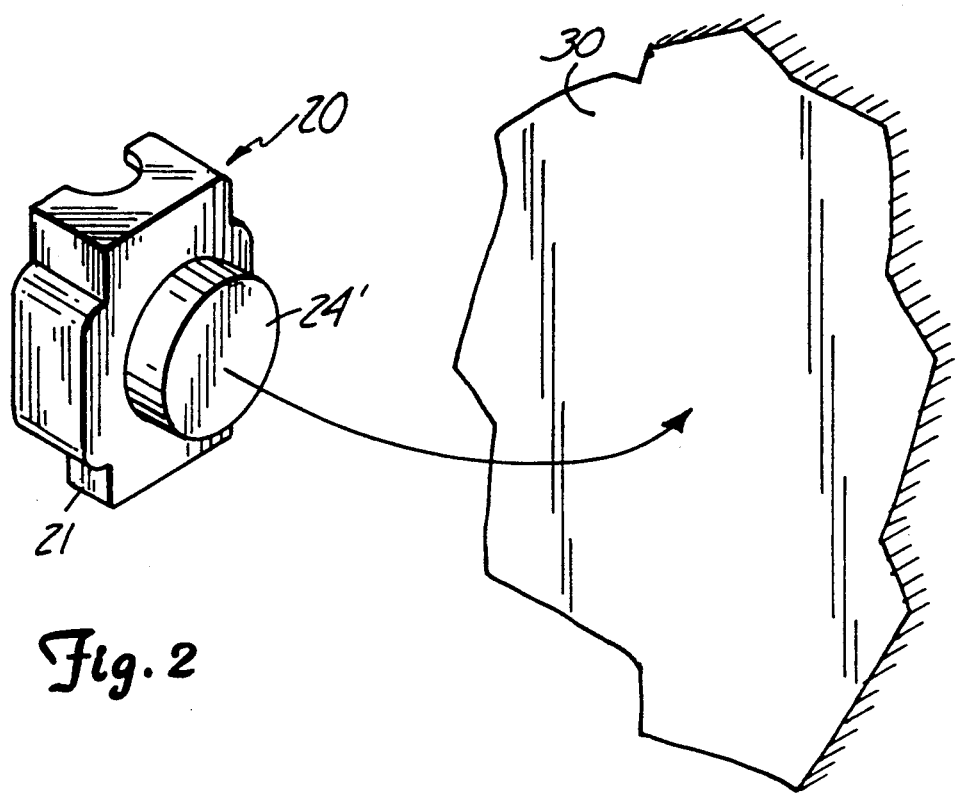
FIG. 2 shows an alternative embodiment and a corresponding use situation in part in a pictorial view.

Although the double backed adhesive tape as shown is part of holder 20 in FIG. 1, many other alternatives exist which may be more convenient in the same or other circumstances. That is, rather than using the relatively more permanent connection which may come about by the use of double-backed adhesive tape as the support engagement arrangement, a more temporary arrangement is possible with some other kind securing arrangement being used as an alternative for support engagement arrangement 24. Thus, FIG. 2 shows the use of a magnet, 24', in place of double backed adhesive tape 25. One side of magnet 24' is mechanically affixed to base 21 of holder 20, whether by adhesive or by some mechanical fastener. A fragmentary part of a selected support structure, 30, is shown having a magnetizable surface. Holder 20 can be secured to that magnetizable surface portion of support structure 30 by magnet 24'.

Figure 3:
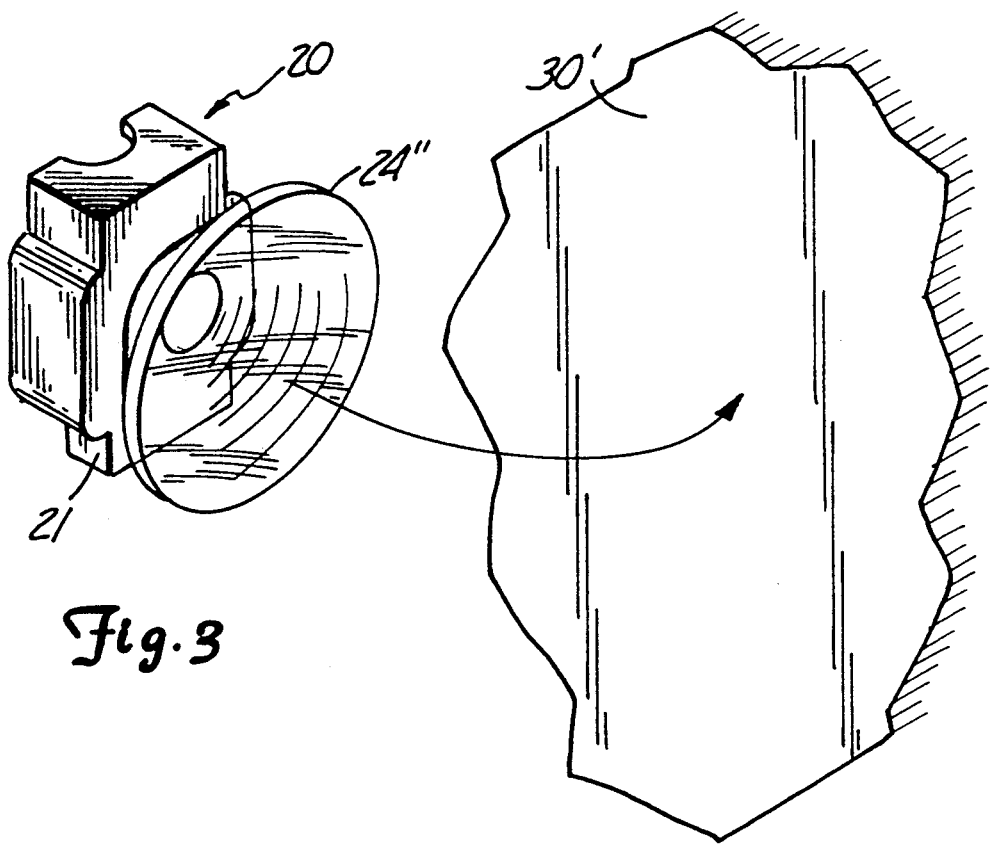
FIG. 3 shows an alternative embodiment and a corresponding use situation in part in a pictorial view.

FIG. 3 shows a further alternative in which a polymer suction cup, 24" is used in the support engagement arrangement of holder 20 in place of either of magnet 24' or double-backed adhesive tape 25. The supporting structure, 30', is shown having a surface which is sufficiently smooth to allow a vacuum to ensue within cup 24" after holder 20 is forced thereagainst with cup 24" being in direct contact with that surface of support structure 30'.

Figure 4:
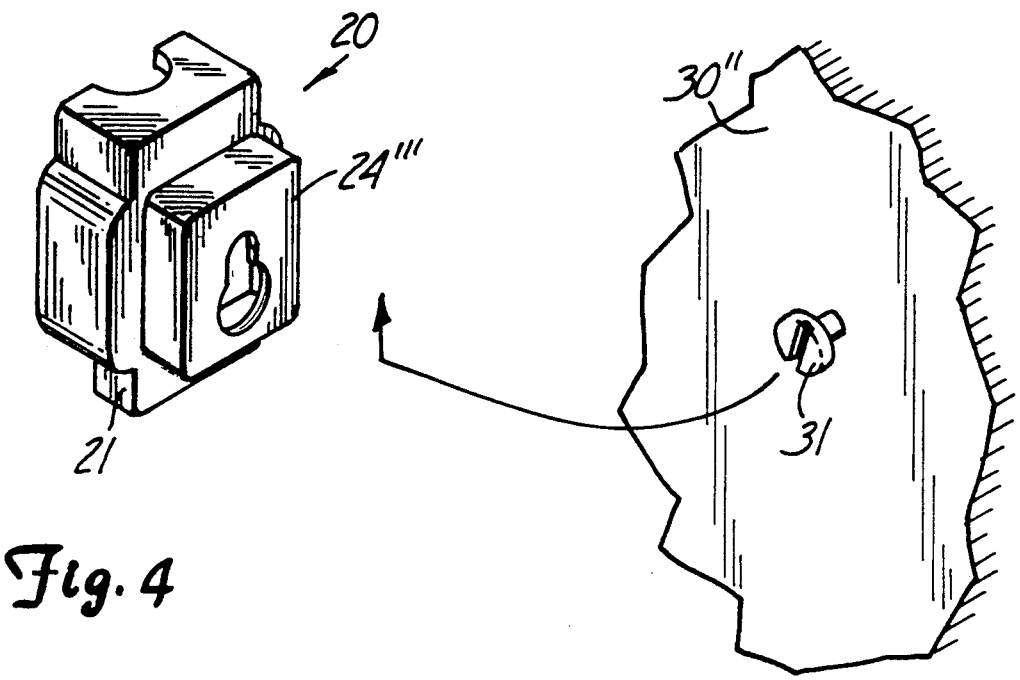
FIG. 4 shows an alternative embodiment and a corresponding use situation in part in a pictorial view.

Another alternative for affixing holder 20 to a surface of a supporting structure is shown in FIG. 4. There, a screw, 31, has been partially turned into the surface of a supporting structure, 30", with a portion of the head and shank thereof remaining exposed outside that surface. A slotted bracket, 24''', extends from base 21 and holder 20 and partially spaced apart from base 21 so that there is a void between base 21 and the bracket slot. The slot has a large enough opening at one end thereof to pass the head of screw 31 therethrough, but only a large enough opening at the opposite end thereof to pass the shank of screw 31 therethrough. Thus, bracket 24''' in holder 20 can be hung on screw 31.

Figure 5:
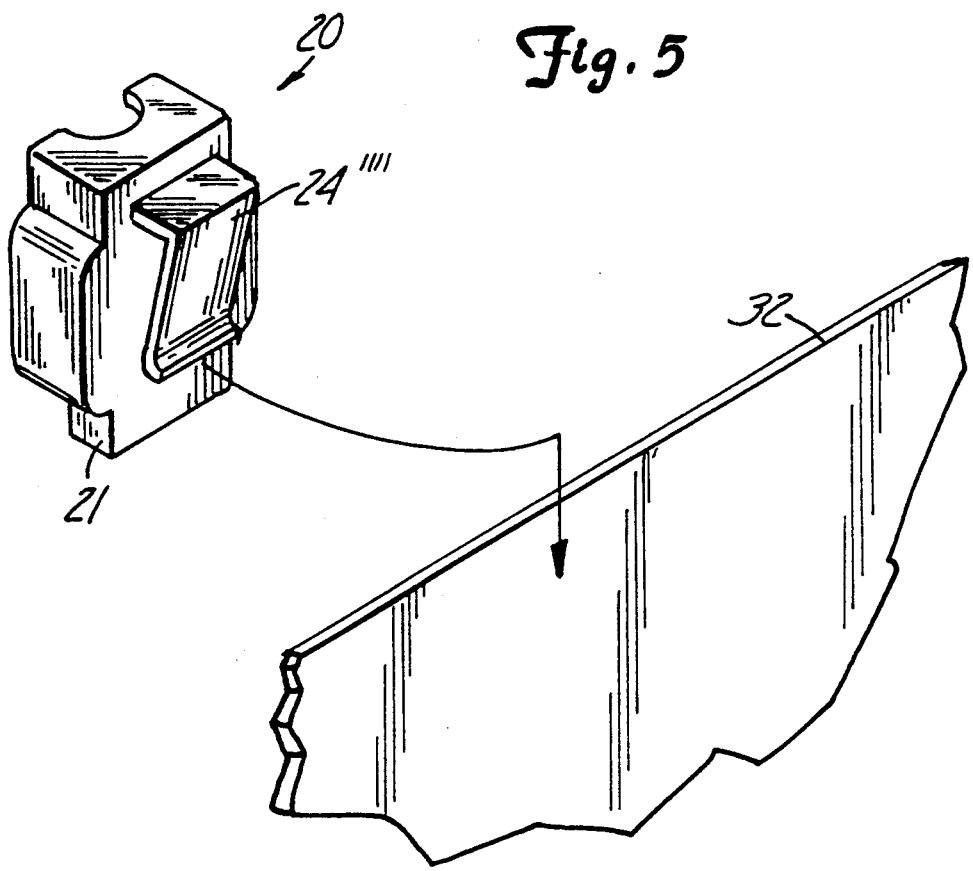
FIG. 5 shows an alternative embodiment and a corresponding use situation in part in a pictorial view.

Alternatively, the supporting structure can be a relatively thin layer having an edge so that a clip may be used as holding arrangement 24 in holder 20. A support structure, 32, with a relatively thin layer having an edge is shown in FIG. 5. A clip, 24'''', extending from base 21 of holder 20 can be slid over this edge of structure 32. Clip 24'''' has one end thereof anchored in base 21 of holder 20 so that structure 32 will be squeezed between base 21 and clip 24''''. Clip 24'''' is typically formed of the same material as is base 21.

However, a stronger clip can alternatively be provided, as is shown in FIG. 6, where a metal clip, 24$^v$, with a greater resistance to bending is shown affixed to base 21 of holder 20. Clip 24$^v$ is typically formed of a metal and is shown with a wire lever to enable the user to more easily spread it apart from the portion thereof affixed to base 21. Thus, a stronger gripping of the layer in support structure 32 can be achieved. Also, other kinds of support structures may be more easily gripped and held by the use of a stronger clip like that of 24$^v$.

Figure 8:
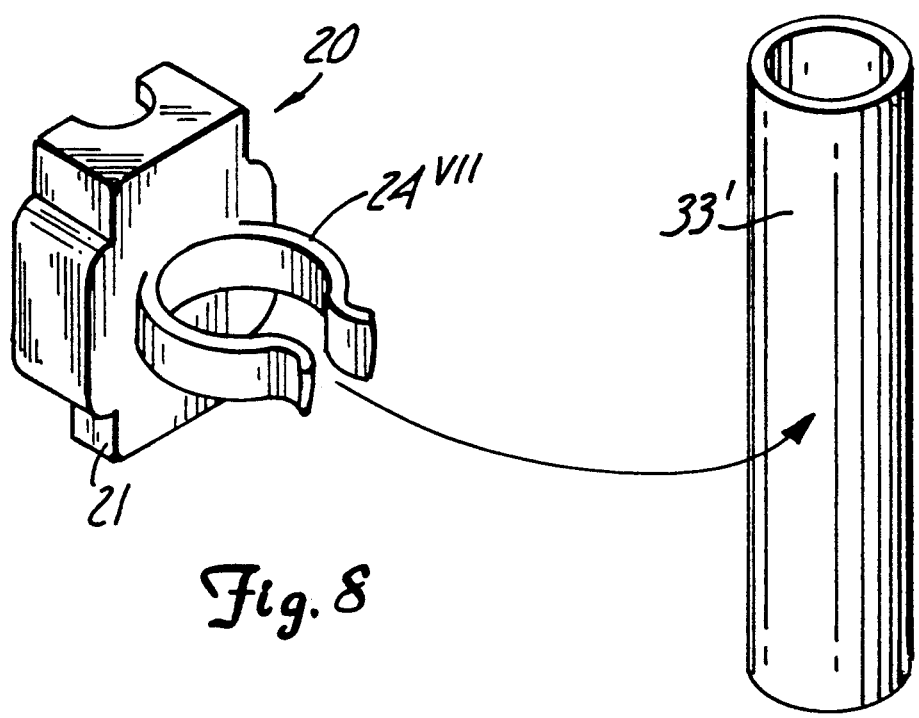
FIG. 8 shows an alternative embodiment and a corresponding use situation in part in a pictorial view.

A further alternative is shown in FIG. 7 where a hook, 24$^v$, is shown extending from base 21 of holder 20. The supporting structure, 33, here is shown as a pipe or round rail over which hook 24$^{v'}$ can be slid to thereby partially surround that pipe or rail. Somewhat similarly, FIG. 8 shows a spring clamp, 24$^{v''}$ extending as two opposing arms from base 21 of holder 20. Here, a vertical pipe or round rail, 33', is shown so as to be able to receive clamp 24$^{v''}$ being partially slid around either side thereof to clamp onto that pipe and support holder 20 at the desired location therealong.

Although the present invention has been described with reference to preferred embodiments, workers skilled in the art will recognize that changes may be made in form and detail without departing from the spirit and scope of the invention.

What is claimed is:

1. A receptacle plug holder for supporting at a selected location electrical receptacle plugs of electrical extension cords, said receptacle plug holder comprising:

an electrically insulating base portion;

an electrical receptacle engagement portion extending from said base portion and capable of engaging a said electrical receptacle plug on an end of a said electrical extension cord to hold that said electrical receptacle plug by having a pair of spaced apart blades extending substantially parallel to one another and sized to be forcibly, but removably, insertable in corresponding blade receptacles in that said electrical receptacle plug; and a support engagement portion extending from said base portion and capable of engaging a selected support structure to become substantially affixed thereto.

2. The apparatus of claim 1 wherein said support engagement portion, insofar as being substantially affixed to a said selected support structure as aforesaid, is removably affixed thereto.

3. The apparatus of claim 1 in which said support engagement portion is separable from said base portion.

4. The apparatus of claim 1 wherein said support engagement portion has an adhesive on a surface thereof facing at least in part away from said base portion.

5. The apparatus of claim 2 wherein said support engagement portion has a magnet affixed to a surface therein facing at least in part away from said base portion.

6. The apparatus of claim 2 wherein said support engagement portion has a hook affixed to a surface therein facing at least in part away from said base portion.

7. The apparatus of claim 2 wherein said support engagement portion has a clamp affixed to a surface therein facing at least in part away from said base portion.

8. The apparatus of claim 2 wherein said support engagement portion has a suction cup affixed to a surface therein facing at least in part away from said base portion.

9. The apparatus of claim 2 wherein said support engagement portion has a slotted bracket affixed to, and partially spaced apart from, a surface therein and facing at least in part away from said base portion.

10. The apparatus of claim 2 wherein said support engagement portion has a clip affixed to a surface therein facing at least in part away from said base portion.

11. The apparatus of claim 4 wherein said adhesive is on one side of a piece of tape also having adhesive on an opposite side thereof.

12. A receptacle plug holder for supporting at a selected location electrical receptacle plugs of electrical extension cords, said receptacle plug holder comprising:
an electrically insulating base portion;
an electrical receptacle engagement portion extending from said base portion and capable of forcibly engaging a said electrical receptacle plug on an end of a said electrical extension cord to removably hold that said electrical receptacle plug; and
a support engagement portion extending from said base portion and capable of engaging a selected support structure to become substantially affixed thereto without substantially piercing a surface of said support structure.

13. The apparatus of claim 12 wherein said support engagement portion, in being substantially affixed to a said selected support structure, is removably affixed thereto.

14. The apparatus of claim 12 in which said support engagement portion is separable from said base portion.

15. The apparatus of claim 12 wherein said support engagement portion has an adhesive on a surface thereof facing at least in part away from said base portion.

16. The apparatus of claim 12 wherein said support engagement means has a selected one of a magnet, hook, clamp, suction cup, clip, affixed to a surface therein facing at least in part away from said base portion.

17. The apparatus of claim 12 wherein said support engagement portion has a slotted bracket affixed to, and partially spaced apart from, a surface therein and facing at least in part away from said base portion.

18. The apparatus of claim 15 wherein said adhesive is on one side of a piece of tape also having adhesive on an opposite side thereof.

* * * * *

UNITED STATES PATENT AND TRADEMARK OFFICE
CERTIFICATE OF CORRECTION

PATENT NO. : 5,308,253

DATED : May 3, 1994

INVENTOR(S) : PHILIP J. MAKI

It is certified that error appears in the above-identified patent and that said Letters Patent is hereby corrected as shown below:

Col. 4, line 38, delete "24'", insert --$24^v$--

Signed and Sealed this

Second Day of August, 1994

Attest:

BRUCE LEHMAN

*Attesting Officer*     *Commissioner of Patents and Trademarks*